United States Patent [19]

Tuggle et al.

[11] E Patent Number: Re. 33,050

[45] Reissued Date of Patent: Sep. 12, 1989

[54] HAND HELD GAS ENGINE BLOWER

[75] Inventors: Lloyd H. Tuggle, Shreveport; Michael Baker, Gloster; Jeffrey S. Franke, Shreveport, all of La.

[73] Assignee: White Consolidated Industries, Inc., Cleveland, Ohio

[21] Appl. No.: 109,996

[22] Filed: Oct. 16, 1987

Related U.S. Patent Documents

Reissue of:
[64] Patent No.: 4674146
Issued: Jun. 23, 1987
Appl. No.: 804,683
Filed: Dec. 3, 1985

[51] Int. Cl.[4] ..... A47L 5/14
[52] U.S. Cl. ..... 15/330; 15/344; 15/405
[58] Field of Search ..... 15/330, 344, 327 C, 15/405, 410

[56] References Cited

U.S. PATENT DOCUMENTS

| | | | |
|---|---|---|---|
| 1,462,223 | 7/1923 | Wright | 15/337 |
| 1,527,377 | 2/1925 | Orr | 15/337 |
| 1,582,295 | 4/1926 | Muenzen | 15/337 |
| 1,583,528 | 5/1926 | Clements | 15/328 |
| 1,759,242 | 5/1930 | Nielsen | 15/331 |
| 1,801,964 | 4/1931 | Kuendig | 285/189 |
| 1,940,609 | 12/1933 | Simpson | 15/344 |
| 2,598,499 | 5/1952 | Breuer et al. | 299/65 |
| 2,671,923 | 3/1954 | LaBriere | 15/337 |
| 2,759,659 | 8/1956 | Hansen | 230/47 |
| 2,974,343 | 3/1961 | Seyfried | 15/323 |
| 2,986,765 | 6/1961 | Ernolf et al. | 15/329 |
| 3,353,338 | 11/1967 | Nilsson | 55/276 |
| 3,711,742 | 1/1973 | Pinkham, Jr. | 317/317 |
| 4,223,419 | 9/1980 | Sato et al. | 15/405 |
| 4,227,280 | 10/1980 | Comer | 15/330 |
| 4,286,675 | 1/1981 | Tuggle | 173/163 |
| 4,288,886 | 4/1981 | Siegler | 15/330 |
| 4,290,165 | 9/1981 | Hiramatsu et al. | 15/330 |
| 4,318,203 | 3/1982 | Satoh et al. | 15/405 |
| 4,325,163 | 6/1982 | Mattson et al. | 15/330 |
| 4,350,123 | 9/1982 | Kossek et al. | 123/173 |
| 4,451,951 | 6/1984 | Satoh | 15/330 |
| 4,461,055 | 9/1984 | Zerrer et al. | 15/344 |

FOREIGN PATENT DOCUMENTS

| | | |
|---|---|---|
| 219017 | 4/1925 | United Kingdom . |
| 488347 | 7/1938 | United Kingdom . |

*Primary Examiner*—Chris K. Moore
*Attorney, Agent, or Firm*—Hubbard, Thurman, Turner & Tucker

[57] ABSTRACT

A hand held portable blower/vacuum assembly includes a gasoline engine mounted on a blower housing that is interchangeably operable as a blower or vacuum unit and is symmetrically arranged for right or left hand use. A U-shaped carrying handle is secured to an upper housing enclosing the engine by means of a mounting structure that includes anti vibration elements. For eliminating the effect of both gyroscopic and centrifugal forces, the engine is arranged with the piston and crankshaft in horizontal and vertical orientations respectively, while both exhaust and cooling air are discharged from the front of the unit away from an operator so as to provide a balanced unit operable with either the right or left hand. A multi-position throttle located on the backside of the unit removed from the handle is incrementally settable for operating the unit at preselected fixed speeds. The vacuum inlet is located on the underside of the housing and is generally closed by a hinged cover providing only for induction air flow when the unit is used in the blower mode. Included about the vacuum inlet is a connecting flange for attaching a vacuum intake tube when the cover is hingedly moved outward for using the unit in the vacuum mode. A discharge opening on the front side of the unit includes a connecting flange to which either a blower tube and nozzle can be attached for the blower mode or tubing and bag can be attached for the vacuum mode.

27 Claims, 7 Drawing Sheets

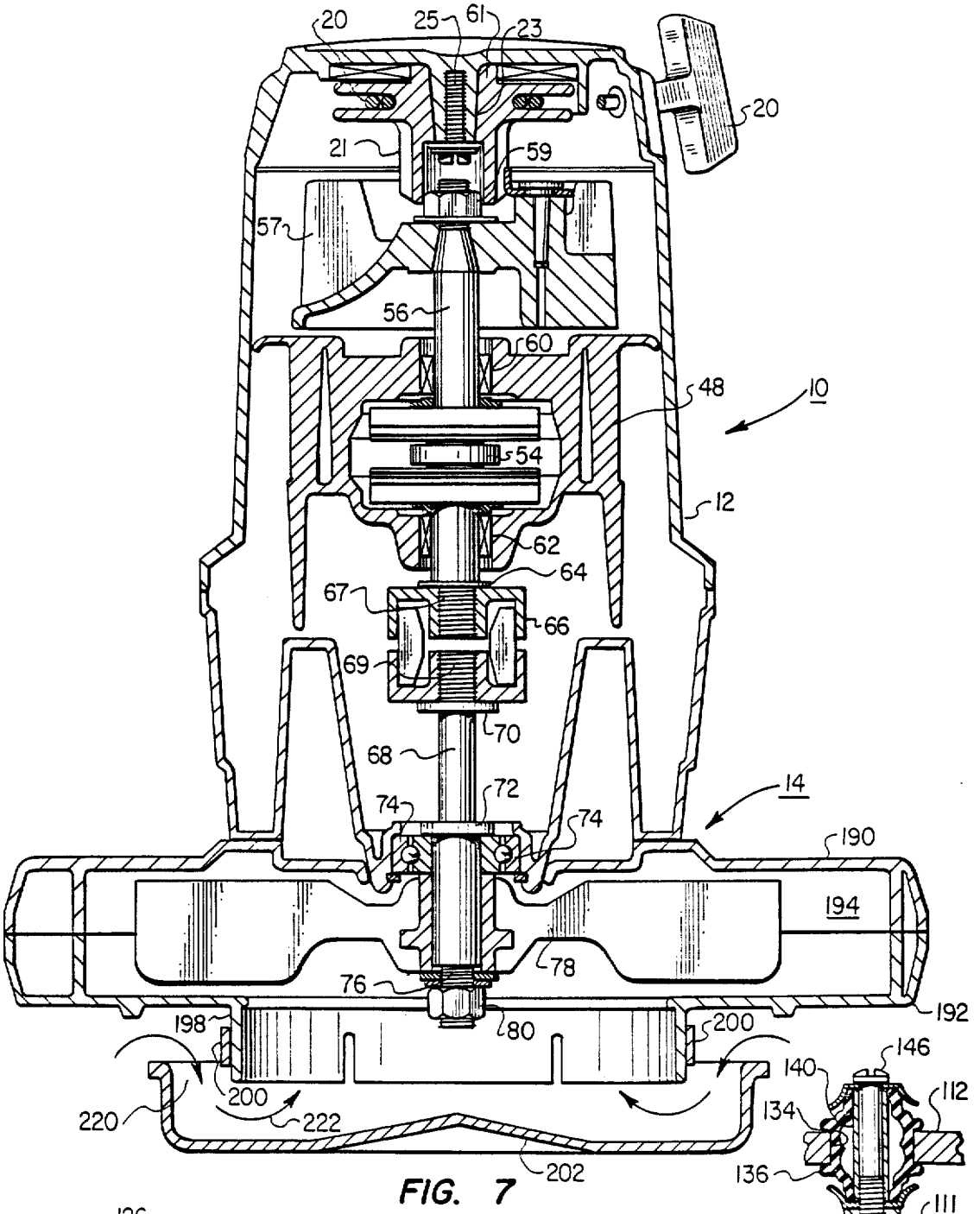
FIG. 7
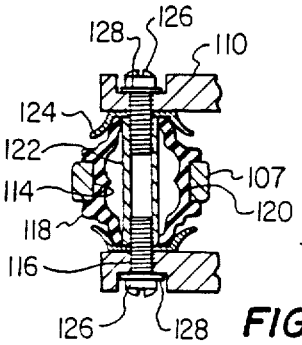
FIG. 10
FIG. 11

HAND HELD GAS ENGINE BLOWER

Matter enclosed in heavy brackets [ ] appears in the original patent but forms no part of this reissue specification; matter printed in italics indicates the additions made by reissue.

FIELD OF THE INVENTION

The field of art to which the invention pertains comprises the art of brushing, scrubbing and general cleaning as more specifically directed toward hand held portable air-blast apparatus in which an internal combustion engine drive a fan-wheel blower.

BACKGROUND OF THE INVENTION

The hand held blower unit has within the 1980's achieved a high level of domestic popularity, principally, for use in and about residential areas and for commercial applications such as sport arenas, etc. Some such units can interchangeably be operative as either a blower or vacuum as disclosed for example in U.S. Pat. No. 4,325,163. These blower units are typically utilized around a home or elsewhere for removing or displacing loose debris or refuse from walkways, gutters, benches or similar surfaces by means of an air blast flow. Commonly, such units are operative by means of an internal combustion engine having a vertically oriented piston motion and a horizontally oriented crankshaft on which the blower impeller is mounted. That construction is known to produce undesirable difficulties in handling of the unit resulting from the gyroscopic and centrifugal forces associated with that arrangement. A construction utilizing an internal combustion engine arranged for piston motion in a relative horizontal orientation with a crankshaft oriented vertically is disclosed in U.S. Pat. No. 4,461,055.

Whatever constructions have been utilized previously however, have generally been characterized by one or more disadvantages either in performance limitations or operator handling. In addition to the gyroscopic problem mentioned, some units are characterized by a weight imbalance, feasibility restriction to right hand use only attributed to an arrangement of operating controls and/or location of engine exhaust, undesirable suck up at start up, etc.

Such units are manufactured by a number of companies and competitively marketed largely on the basis of features, quality and price. For remaining competitive, each manufacturer instinctively strives to improve his product in a way that will enhance sales and increase profit. This has not always been easy to come by in a generally well developed highly competitive art. Obvious desired virtues of such units not universally achieved by constructions of the prior art are lightweight, ease of operation, minimal vibration, right or left hand use, etc., while producing reasonably high volume of highly forceful air in serving the intended purpose of the unit.

SUMMARY OF THE INVENTION

The invention relates to hand held blowers and more specifically to an improved construction for an engine driven blower unit interchangeably operative as either a blower or vacuum unit and symmetrically arranged for right or left hand use. The foregoing is achieved utilizing a gasoline driven engine arranged with a piston and crankshaft in a relatively horizontal and vertical orientation respectively as to eliminate the adverse effect of gyroscopic and centrifugal forces previously associated with units of this type. At the same time both the engine exhaust and cooling air are discharged at the central front in a location removed from the operator while a U-shaped carrying handle, free of operating controls, is secured to an upper housing by means of a mounting structure that includes anti vibration elements.

The handle is of sufficiently greater length and angle than previously utilized as to enable tilting or disposing the unit as desired. A multipositionable throttle located on the backside of the unit is incrementally settable for operating the unit at preselected fixed speeds. The vacuum inlet is located on the underside of the housing raised above the set down engagement portion of the unit and is generally closed by means of a hinged cover providing only for induction air flow when the unit is used in a blower mode. Included about the inlet is a connecting collar for attaching a vacuum intake tube when the cover is opened for using the unit in the vacuum mode. A discharge opening on the front of the unit also includes a connecting flange to which either a blower tube and nozzle can be attached for the blower mode or tubing and bag receptacle can be attached for the vacuum mode.

By virtue of the foregoing construction the unit is advantageously weight balanced and readily handled equally well by either right handed or left handed persons so as to readily accommodate persons of either preference. At the same time, since the suction inlet is raised above the set-down plane of the unit in combination with a cover shielded inlet, suck up of debris during start up is minimized if not eliminated.

It is therefore an object of the invention to provide a novel construction for a hand held blower/vacuum unit affording increased versatility for such units.

It is a further object of the invention to effect the latter object with a highly symmetrical unit affording more ready handling by persons having right or left handed preference.

It is a further object of the invention to effect the foregoing objects with a novel construction for enhancing competitive advantages in features afforded by such units.

BRIEF DESCRIPTION OF THE DRAWINGS

FIG. 7 is a sectional view as seen substantially from the position 7—7 of FIG. 6;

FIG. 10 is a sectional view as seen substantially from the position 10—10 of FIG. 6;

FIG. 11 is a sectional view as seen substantially from the position 11—11 of FIG. 6;

Figure 1:
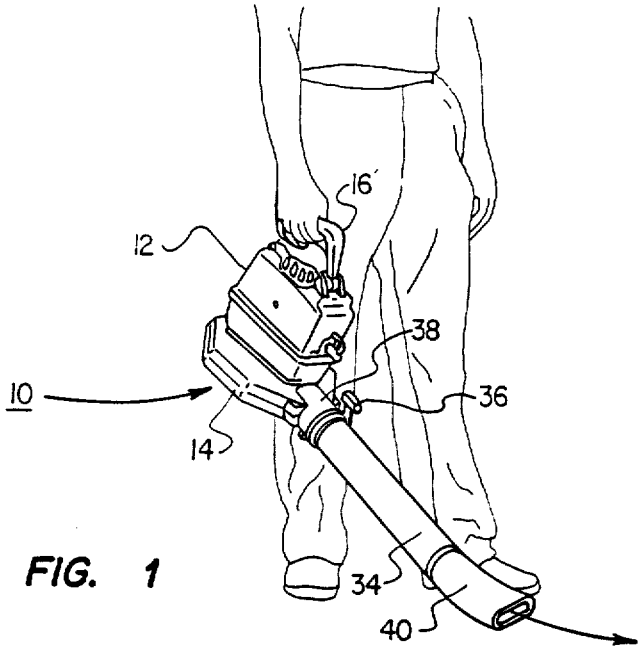
FIG. 1 is pictorial representation of the blower/-vacuum unit hereof as utilized in the blower mode.
Figure 2:
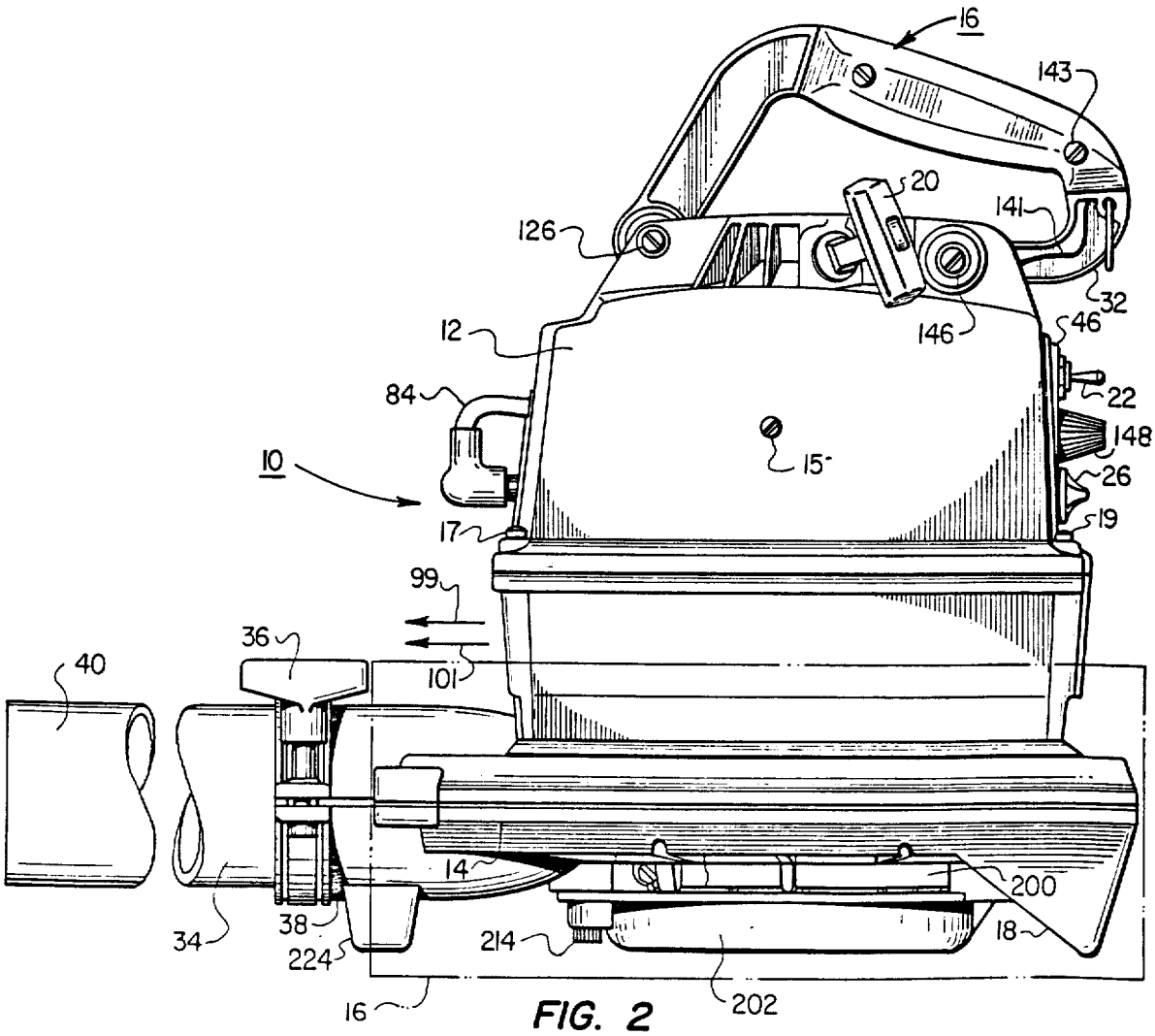
FIG. 2 is an enlarged side elevation of the blower/-vacuum unit illustrated in FIG. 1.
Figure 3:
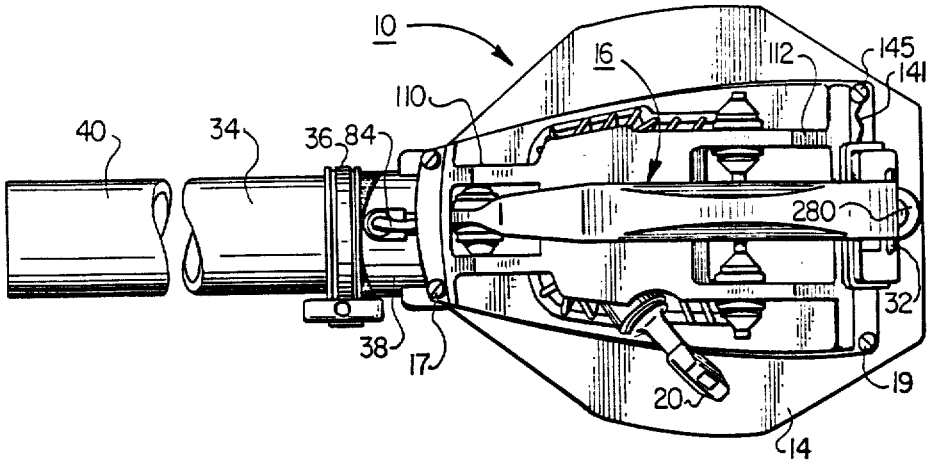
FIG. 3 is a top planar view of the blower/vacuum unit illustrated in FIG. 1.
Figure 4:
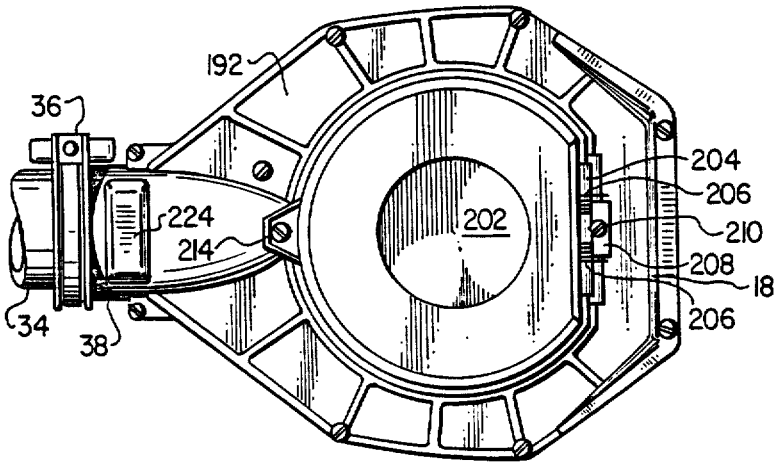
FIG. 4 is an underside planar view of the blower/-vacuum unit illustrated in FIG. 1.

Referring generally to FIGS. 1–5 and 15, the blower/vacuum unit hereof is attractively designed and generally designated 10. The unit is comprised of a two cycle gasoline engine 48 (FIG. 6) enclosed in a housing 12 to which a blower housing or shroud 14 is mounted underneath. Screws 15, 17 and 19 enable removal of housing 12 for engine servicing. For portable carrying of the unit, a handle 16 is secured to the top side of housing 12 while at the underside the housing 14 includes a downwardly depending second handle 18 enabling two handed operation when required. A downwardly depending foot 224 terminates coplanar with the underside of handle 18 so that the unit can be set down when not in use. Operating appurtenances for the unit as generally illustrated in these figures include a starter rope handle 20, an on/off switch 22, a throttle control unit 24, a choke 26 and a filler fuel cap 28 with all but rope handle 20 being contained on the backface of housing 12. For securing a shoulder strap 30 (FIG. 15), handle 16 includes a ring 32.

For utilizing unit 10 in the blower mode illustrated in these Figures, there is included a blower tube 34 adapted to be secured via a handle clamp 36 to a discharge tube 38 extending forward from the front end of the housing 14. Threadably connected to the blower tube 34 is an arcuate nozzle extension 40. When utilized in the vacuum mode of FIG. 15, blower tube 34 is replaced by a bag 44 and elbow unit 45 connected to discharge tube 38 and having a shoulder strap 30 while a vacuum intake tube 42 is connected to the underside of housing 14 as will be described.

Engine 48, as can be best understood with reference to FIGS. 5–12, is generally enclosed within fan housing 12 and is arranged with cylinder 50 containing a piston 52 reciprocally operable in a horizontal plane within finned engine block 51. In this arrangement connecting rod 54 is mounted on crankshaft 56 having a vertical orientation and supporting flywheel 57 in a vertical axis so as to minimize any gyroscopic effect on the operator. Securing flywheel 57 thereat is by means of nut 59 immediately above which is a springbiased starter pulley 61 on which starter rope 20 is wound. The pulley includes a downwardly depending pulley ratchet 21 engageable with nut 59 and is mounted on housing knob 23 by means of screw 25.

Crankshaft 56 is supported for rotation in a crankcase assembly 58 that includes bearings 60 and 62. Beneath bearing 62 the crankshaft includes a flange 64 engaging a top surface of a coupling 66 to which the crankshaft is threadedly connected via end nipple 67. Joined threadedly to the underside of coupling 66 via a nipple 69 is a shaft-arbor 68 that includes a flange 70 engaging the underside of coupling 66 and extending downward to lower flange 72 seated against the inner race of ball bearing 74. Bearing 74 supports shaft-arbor 68 for rotation and beneath which the shaft-arbor extends to a threaded nipple 76. Mounted for rotation on arbor shaft 68 at that location is impeller 78 secured by means of nut 80 and washer 81.

Fuel 83 is contained in tank 85 that is secured in position by a screw 87 and retainer 89 secured against a cushion 91. Fuel from the tank is supplied to carburetor 182 having an air intake opening 183 containing cellulose filter element 185. Securing carburetor 182 mounted in position are bolts 189 and 191.

Engine ignition is provided when switch 22 is in the "on" position by spark plug 82 secured in finned engine block 51 through threaded plug bore 53 communicating with cylinder 50. Plug 82 connects via lead wire 84 to a solid state ignition module 86 mounted on the block by means of clamp 88 and bolt 90. Communicating with a side face of cylinder 50 is a port 92 enlarging to a diffuser-muffler 94 extending inward of body muffler assembly 96 contained within enlarged cavity 97. Muffler assembly 96 is positioned forward of heat deflector shield 103 and includes a cover 98 and a tubular neck 100 leading to outward of housing 12 for discharging engine exhaust 99. Securing the muffler assembly in position are a pair of tensioned springs 102, 104 (FIG. 9) that extend from the underside of cover 98 to ear projections 106 and 108 respectively. In this arrangement engine exhaust is discharged through muffler neck 100 at a centrally front location forward of handle 16 and in a forward direction away from an operator standing behind the unit. Concomitantly discharging in a forward direction from cavity 97 about muffler assembly 96 is ambient cooling air 101 passing over finned block 51.

Handle 16 is of substantially U-shaped configuration that includes an angularly upward extending front leg 107 joined to a backwardly inclined central hand grip 109 which in turn is joined to a horizontal reverse-bend rear leg 111. For securing handle 16 to housing 12 in a manner affording minimum of engine vibration transmitted to the handle, there is provided on the topside of housing 12, as best seen in FIGS. 3, 5, 10 and 11, a pair of upstanding spaced apart lugs 110 toward the front of the housing and a pair of spaced apart upstanding lugs 112 near the rear of the housing. For effecting joinder of handle 16 with the front lugs 110, front leg 107 includes a transverse aperture 114 adapted to align axially with apertures 116 in the lugs. Mounting thereof includes a resilient hard rubber isolator 118 centrally recessed at 120 for insertion within handle aperture 114. Enclosed within the isolator is a tubular spacer 122 internally threaded at both ends for receipt of cap screws 126. Cup washers 124 are positioned at either end of spacer 122 about the isolator ends and against the inside face of the lug 110 thereat. Cap screws 126 along with a washer 128 threaded inward of spacer 122 secure the assembly in position.

Rear mounting of the handle to housing 12 is effected similarly in that lower handle leg 111 terminates in a T-shaped connector 130 having oppositely threaded bores 132. Each lug 112 includes an aperture 134 for receiving a grommet-like isolator 136 of construction similar to that described above with respect to isolator 118. A recess 138 in each of the isolators enables positioning the isolator in an aperture 134 of lug 112 along with an internal spacer 140. With cap washers 142 and 144 in position the entire unit is assembled together via elongated screws 146 threaded into bores 132.

Figure 5:
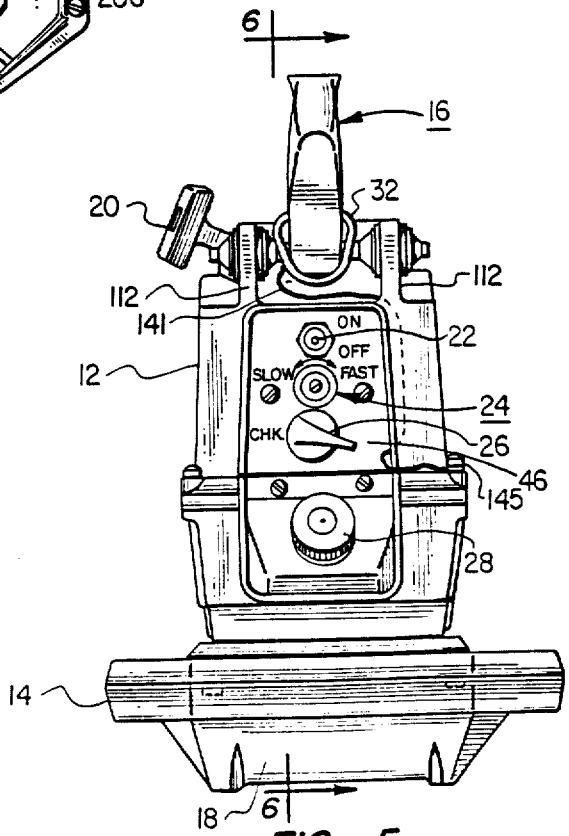
FIG. 5 is a rear elevation of the blower/vacuum unit illustrated in FIG. 1.
Figure 6:
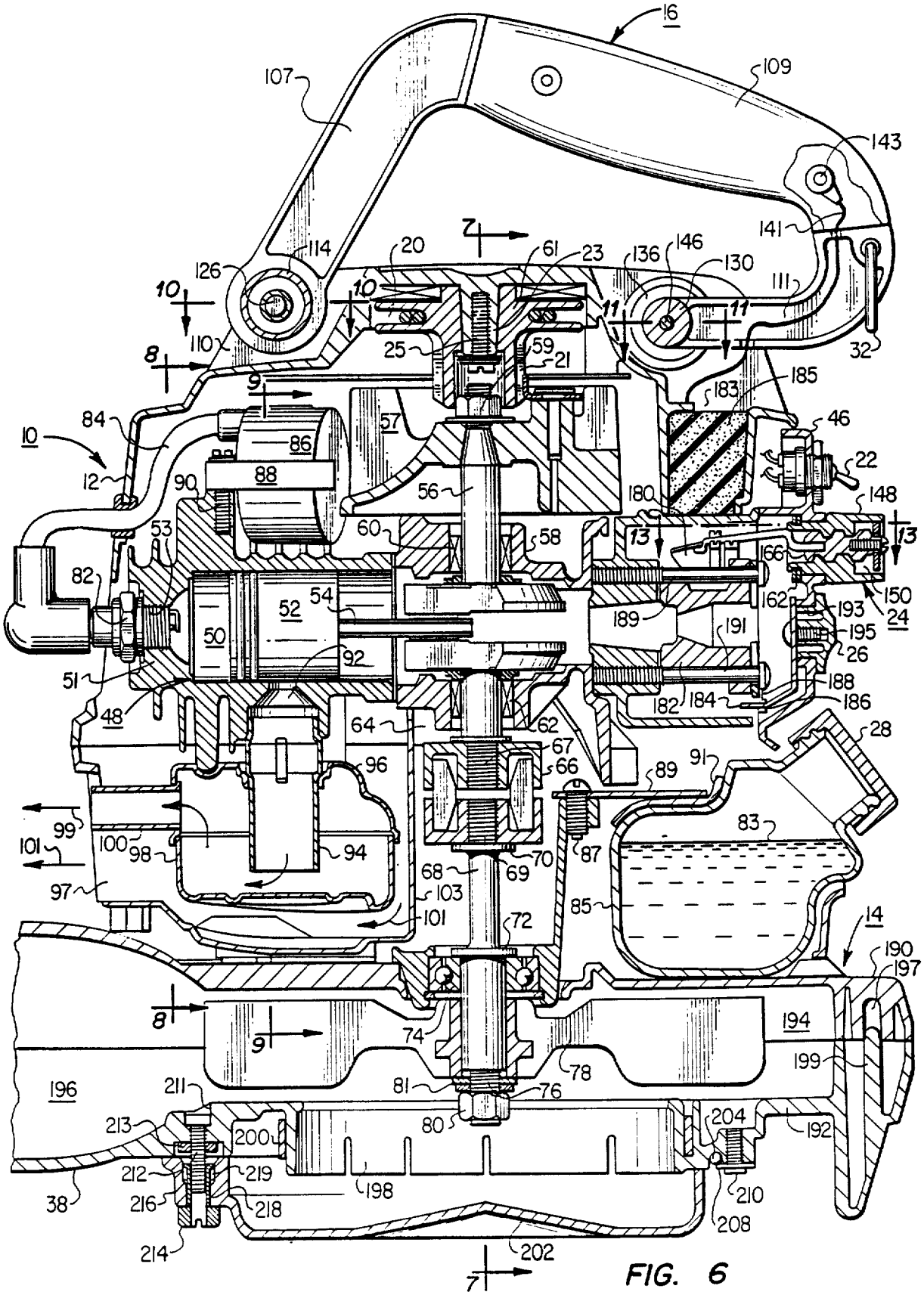
FIG. 6 is a sectional view through the unit as seen substantially from the position 6—6 of FIG. 5.
Figure 8:
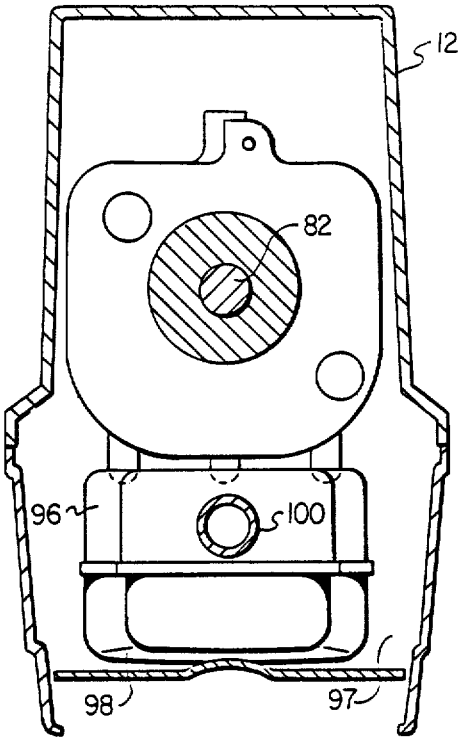
FIG. 8 is a sectional view as seen substantially from the position 8—8 of FIG. 6.
Figure 9:
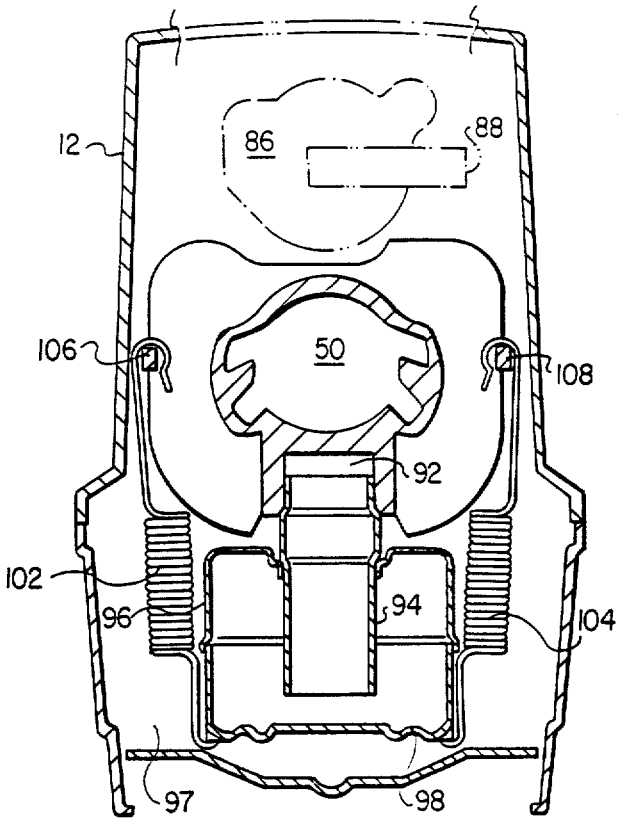
FIG. 9 is a sectional view as seen substantially from the position 9—9 of FIG. 6.
Figure 12:
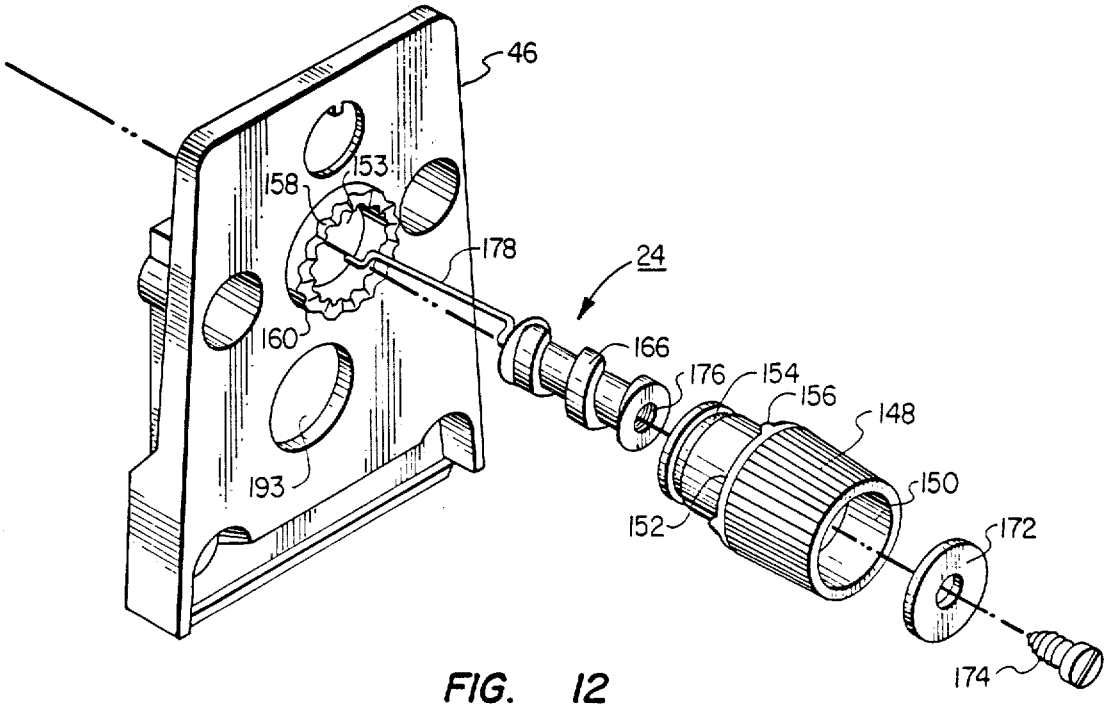
FIG. 12 is an exploded isometric view of the throttle control apparatus.
Figure 13:
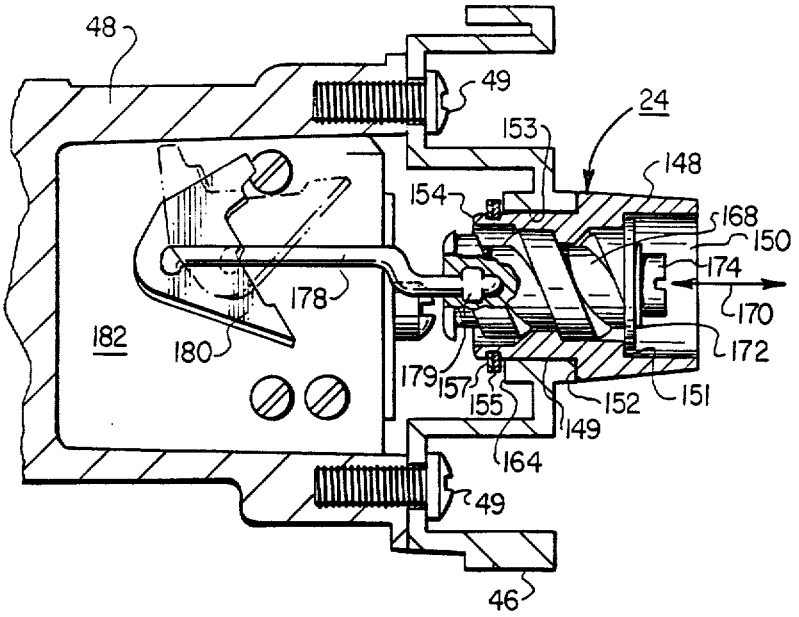
FIG. 13 is a sectional view as seen substantially from the position 12—13 of FIG. 6.

In the preferred embodiment user protection against static shock is provided in that the handle 16 is of an electrically conductive composition such as a special conductive molded plastic polymer comprised for example of nylon containing about ten percent carbon. Grounding of the handle is achieved by means of wire 141 secured to handle 16 by screw 143 and extending to a connection with a metal portion of the blower via screw 145 (FIGS. 5 and 6). In this arrangement wire 141 passes from the handle 16 into and then out of housing 12.

Throttle control 24 will now be described with specific reference to FIGS. 5, 6 and 12–14. As thereshown, the throttle control is comprised of a generally hollow knob 148 having a recess 150 at its rear and forming a shoulder 152 toward its front. From that point the knob includes a reduced diameter neck 149 extending to its distal end through an aperture 153 in rear housing cover plate 46 secured to block 51 by bolts 49. Near the distal end of knob 148 there is provided an annular recess 154 on which is contained a wave washer 155 and retainer ring 157. Shoulder 152 includes a plurality of protuberances 156 uniformly spaced circumferentially at a controlled angular spacing as will be understood. When assembled in position protuberances 156 are adapted to engage the incrementally troughed face 158 of boss 160 formed on the front face of cover plate 46 surrounding opening 153. Washer 155 and retainer ring 157 secure knob 148 thereat in a springlike compression with protruberances 156 engaging the incremental troughs 158. The circumferential spacing of protruberances 156 is made to correspond with a multiple of trough increments 158 as to enable position setting of the knob 148 in a spring-like rotational movement to increase or decrease a fixed operating speed of engine 48.

Longitudinally extending internally of knob 148 is helix cam member 166 adapted to be engaged by a follower 168 on the internal surface of knob 148. In this arrangement, rotation of the knob in one direction will cause an inward longitudinal displacement movement of the cam as represented by arrow 170 while rotating knob 148 in the other direction will cause an outward displacement movement of the cam as represented by arrow 170. A screw 174 with a washer 172 is positioned within recess 150 and threadedly secured to cam aperture 176 as to limit cam movement leftward of knob shoulder 151 as viewed in FIG. 13. Extending leftward from the distal end of the cam is an elongated u-shaped rigid wire actuator 178 having a bead 179 secured molded-in-place within knob 140. Actuator 178 generally extends at an angular offset with respect to the axis of cam 166 and connects to an arcuately displaceable throttle plate 180 controlling a butterfly valve (not shown) in carburetor assembly 182. Choke knob 26 (FIG. 6) is mounted extending through cover plate aperture 93. Mounted on the backface of choke knob 26 by means of screw 195 is a rotatable offset arm 184 extending inward to engage a slot 186 in a shutter choke plate 188 of the carburetor.

Blower housing or shroud 14 as will now be described with particular reference to FIGS. 2, 4–7 and 16 is formed of complementary mating sections including a top section 190 and a lower section 192 partially interfitting between upper arcuate cavity 197 and lower arcuate rib 199. Together the sections form an enclosure cavity 194 containing impeller 78. Extending laterally towards the front side of the unit is the enlargement from a passage 196 to air discharge tube 38.

Forming the vacuum inlet to cavity 194 at the underside of section 192 is a circumferentially slit collar 198 on which to receive and mount vacuum intake tube 42. About collar 198 is contained an adjustable band clamp 200 for securing the vacuum intake tube in position when the tool is to be utilized in the vacuum mode as will be described. Supported to alternatively cover or expose collar 198 in a cover door 202 secured to pivot pin 204 and which is biased toward a closed position of the cover via a pair of spring members 206 wound about pin 204. A washer 208 and a screw 210 secure pin 204 in position. It is important to note that in a preferred embodiment the undersurface of cover 202 in the closed position is in a plane coincident with undersurfaces of handle 18 and foot 224 (FIG. 2) to afford stability when the unit is free standing on a flat surface.

For latching cover 202 in the closed position, there is provided a downwardly dependent male screw 212 (FIG. 6) supported in a counterbore 211 and secured by nut 213 and adapted to be received within the threaded portion of female thumb screw 214. For containing screw 214, cover 202 includes a radial projection 216 having an aperture 218 and a counterbore 219. By thumb or screwdriver rotation of screw 214 with cover 202 in the closed position, screw 212 will engage the internal threads thereof until a clamping action is achieved between the opposed surfaces thereat. With cover 202 in the closed position and tool 10 being operative in the blower mode, debris is generally prevented from entering suction collar 198, there being defined an air induction passage 220 intervening, as illustrated by the arrows 222 in FIG. 7, between the internal diameter of the cover 202 and the external diameter of collar 198.

*This anti-entrainment function provided by the cover 202, and the elevated air induction passage 220 which it defines with the collar 198, is of particular benefit when the bottom end of the unit is rested upon or placed in close proximity to the ground adjacent small but relatively heavy ground-disposed objects such as pebbles or the like. With the cover 202 in its collar-covering position depicted in FIG. 7, and the unit in its blower mode with the impeller 78 being rapidly rotated by the engine 48, pebbles or the like adjacent the cover 202 are essentially prevented from being drawn inwardly through the induction passage 220. This is due to the fact that the illustrated cover member 202 and the passage 220 which it defines automatically function to maintain the velocity of ground level inlet air being drawn toward the cover member 202 and the passage 220 at a magnitude generally insufficient to entrain the pebbles or the like into such ground level inlet air. The potential for ingesting pebbles or the like into the lower housing cavity 194, and then rapidly discharging them, projectile-like, from passage 196 is thus greatly diminished.*

Figure 15:
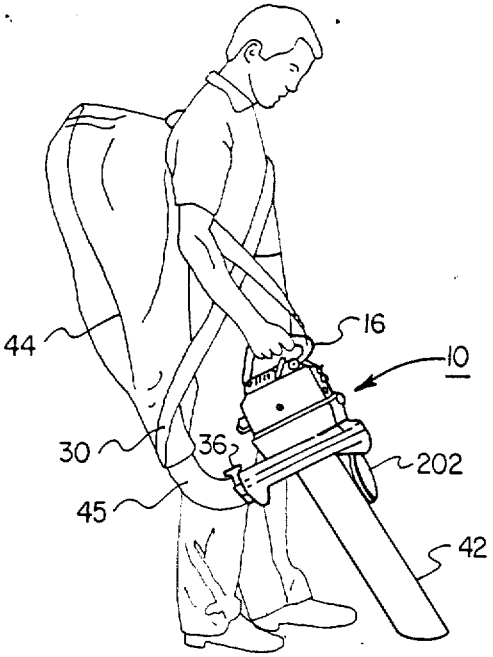
FIG. 15 is a pictorial view of the blower/vacuum unit hereof as utilized in the vacuum mode.
Figure 14:
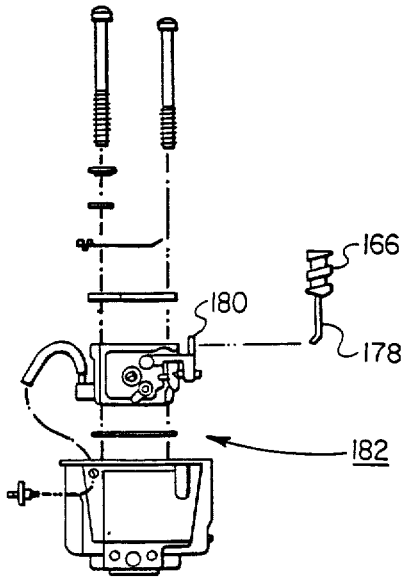
FIG. 14 is an exploded elevation of the throttle to carburetor connection.
Figure 16:
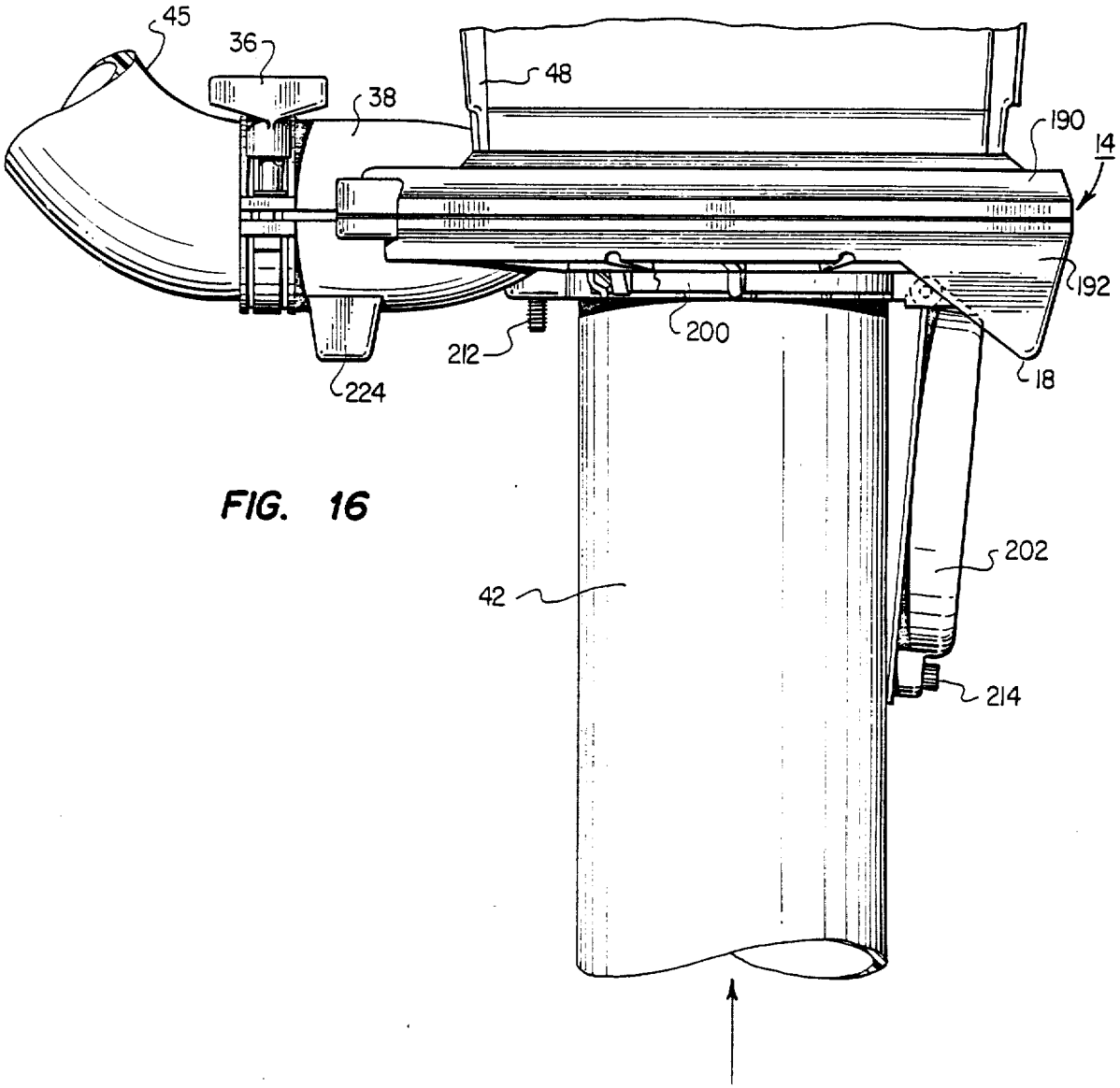
FIG. 16 is an enlarged fragmentary view of the encircled portion of FIG. 6 as modified for using the unit in the vacuum mode of FIG. 15.

For converting the unit 10 from the blower mode of FIGS. 1–7 to the vacuum mode of FIGS. 15 and 16, it is only necessary to loosen hand clamp 36 to remove the blower tube 34 and nozzle 40 from discharge tube 38. With the unit upended on its back side so as to expose cover 202, thumb screw 214 is operated to release the connected with screw 212. With the cover 202 in the open position of FIG. 16 exposing inlet collar 190, vacuum intake tube 42 is inserted within collar 198 after which clamp 200 is screwdriver tightened to secure tube 42 in position. Thereafter, elbow 45 to which bag 44 is secured is positioned inward of tube 38 and secured thereat by handclamp 36. With shoulder strap 30 appropriately wrapped about the operator and connected to handle ring 32, engine 48 can be started by throwing switch 22 and pulling rope handle 20.

By the above description there is disclosed novel structure for a hand held compact blower unit that can be readily interchanged for enabling operation in a blower mode or vacuum mode. By means of the engine having a piston and crankshaft in a horizontal and vertical orientation respectively, both exhaust and cooling air can conveniently be discharged from the front of the unit away from an operator while minimizing any gyropscopic effect that could otherwise occur. All operating apurtenances requiring operator positioning or selection are located conveniently on the back of the unit where they can be readily seen and adjusted as required when hand held by the operator. The foregoing features in combination provide a balanced and symmetrical unit that is readily operable by persons haivng right hand or left hand preference.

Specifically feature is a multipositionable throttle incrementally settable for operating the unit at preselected fixed speeds. The vacuum unit being located on the underside of the housing is generally closed over by a cover plate during the blower mode and which cover plate can be hingedly displaced for mounting a vacuum intake tube when operating in the vacuum mode. Consequently, the construction hereof affords improvements in features of construction and performance that are highly desirable in competitive units of this type.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A portable power tool comprising an internal combustion engine, a first housing enclosing said internal combustion engine, a blower unit mounted on the underside of said internal combustion engine and having a second housing containing a blower impeller operably connected to the crankshaft of said internal combustion engine, an operator's handle mounted along the top of said first housing, said internal combustion engine being arranged with its crankshaft in a substantially vertical orientation relative to the normal carrying mode of said tool, said second housing including a vacuum opening defined in the bottom wall thereof and a discharge opening defined in a sidewall thereof, connecting means at said openings adapted for connecting appurtenances enabling interchangeably operating said tool alternatively in either a blower mode or a vacuum mode including a tubular collar surrounding each of said openings adapted to receive a tubular extension for mounting thereat and clamp means associated with each of said collars for securing a tubular extension received in the respective of said openings and a cover unit pivotally supported on said second housing and positionable between a first position exposing said vacuum collar to enable securing a tubular extension thereat and a second position generally underlying said vacuum collar for precluding receipt of a tubular extension thereat.

2. A portable power tool according to claim 1 including spring means urging said cover unit pivotally toward said second position and latch means to enable securing said cover unit in said second position.

3. A portable power unit according to claim 1 in which said cover unit is dimensionally larger than the diametrical dimension of said vacuum collar so as to define an air inlet therebetween when said cover unit is in said second position.

4. A portable power tool according to claim 3 in which for operating said tool in a blower mode said cover unit is positioned in said second position and there is included an elongated tubular extension mounted on said discharge collar.

5. A portable power tool according to claim 1 in which for operating said tool in a vacuum mode, said cover unit is positioned in said first position and there is included a first elongated tubular extension mounted on said vacuum collar and a second tubular extension mounted on said discharge collar and a refuse collection receptacle connected to the discharge end of said second extension.

6. A portable power tool according to claim 1 in which said handle is oriented so that the normal carrying mode of said tool is with its forwardmost face generally forward of an operator carrying said tool and there is provided means to discharge engine exhaust through said forwardmost face in a direction away from the operator.

7. A portable power tool according to claim 6 in which there is defined an air outlet through said forwardmost face for discharging ambient air carrying heat from about the surface of said engine.

8. A portable power tool comprising an internal combustion engine, a first housing enclosing said internal combustion engine, a blower unit mounted on the underside of said internal combustion engine and having a second housing containing a blower impeller operably connected to the crankshaft of said internal combustion engine, an operator's handle mounted along the top of said first housing, said internal combustion engine being arranged with its crankshaft in a substantially vertical orientation relative to the normal carrying mode of said tool, said second housing including a vacuum opening defined in the bottom wall thereof and a discharge opening defined in a sidewall thereof, connecting means at said openings adapted for connecting appurtenances enabling interchangeably operating said tool alternatively in either a blower mode or a vacuum mode and a throttle control means operably connected to the engine carburetor and including adjustable means incrementally settable at any of a plurality of selected predetermined fixed speeds of said internal combustion engine for operably setting said throttle control means.

9. A portable power tool according to claim 8 in which said adjustable means includes a hollow knob rotatably supported at the rear of said first housing, an elongated cam received within said knob, a follower formed on an internal surface of said knob positioned in engagement with said cam and effective when said knob is rotated to longitudinally displace said cam relative to said knob and an elongated operating link secured extending from the distal end of said cam into operable engagement with said throttle control means for the carburetor of said internal combustion engine.

10. A portable power tool according to claim 8 in which said adjustable means is contained on a rearward face of said first housing for convenient setting by an operator when utilizing said tool.

11. A portable power tool according to claim 8 in which said adjustable means includes a knob rotatably supported through an opening in the rear of said first housing, said knob including a shoulder facing the wall surface of said first housing surrounding said opening thereat, said wall surface including a plurality of consecutive troughs incrementally spaced uniformly in an annular concentric arrangement about said opening, said knob shoulder including a plurality of uniformly spaced protruberances forwardly extending from said shoulder into engagement with said troughs and spring means maintaining said protruberances in a rotatable spring engagment with said troughs for enabling uniform incremental rotation of said knob.

12. A portable power tool according to claim 1, or 8 including vibration isolator means securing said handle to said first housing.

13. A portable power tool according to claims 1, 8 or 9 including grounding means for electrically grounding said handle.

14. A portable power tool according to claim 13 in which said handle is of a composition having electrically conductive properties and there is included a conductor extending from said handle to a metal grounding surface.

15. A portable power tool according to claim 8 in which said adjustable means is located about the exterior of said first housing displaced from said operator's handle.

16. A portable power tool according to claim 15 also including an ignition switch, and a choke adjuster and said adjustable means, said ignition switch and said choke adjuster are all contained spaced apart on a common exterior wall of said first housing.

17. A portable power tool according to claim 16 in which said common wall comprises the rear wall of said first housing.

*18. A portable, hand-carried, internal combustion engine powered air moving device which is configured to conveniently permit either right or left handed use thereof, is easily convertible between blower and vacuum modes of operation, and substantially reduces undesirable gyroscopic forces generated by the engine, said device comprising:*

*a generally hollow body having:*

*a top end with an operator carrying handle secured thereto,*

*a bottom end,*

*a front side,*

*an upper portion adapted to house an internal combustion engine having a muffler assembly, said upper portion having an outlet opening extending through said front side for discharging in a forward direction muffler assembly cooling air from within said upper portion,*

*a lower end chamber downwardly bounded by said bottom end,*

*air inlet means for defining an air inlet opening extending through said bottom end into said lower end chamber, said air inlet means being selectively connectable to vacuum inlet conduit means to permit use of said device in said vacuum mode, and*

*air discharge means for defining an air discharge opening extending outwardly from said lower end chamber through said front side, said air discharge means being selectively connectable to blower discharge conduit means to permit use of said device in said blower mode, or to vacuum outlet conduit means to permit use of said device in said vacuum mode;*

*a cover member carried by said lower end for selective movement relative thereto between a first position in which said cover member extends across a portion of said air inlet means in a manner permitting air to be drawn inwardly through said air inlet opening but precluding connection of vacuum inlet conduit means to said air inlet means, and a second position permitting connection of vacuum inlet conduit means to said air inlet means,*

*an internal combustion engine housed in said upper body portion and including:*

*a crankshaft carried within said upper body portion for driven rotation about an axis which, with said device in a normal operating position, is generally vertically oriented,*

*a cylinder disposed forwardly of said crankshaft within said upper body portion and having a piston mounted in said cylinder for generally horizontal reciprocation when said device is in a normal operating position, said piston being connected to said crankshaft to rotationally drive it during piston reciprocation, and*

*a muffler assembly carried in said upper body portion forwardly of said crankshaft, said muffler assembly being adapted to receive exhaust gas from said cylinder and discharge the received exhaust gas through said front side of said body adjacent said outlet opening; and*

*a centrifugal fan impeller positioned within said lower end chamber and rotationally drivable by said crankshaft about said axis to sequentially draw air into said lower end chamber through said air inlet opening and discharge the air from said lower end chamber outwardly through said air discharge opening.*

*19. The device of claim 18 wherein:*

*said cover member is mounted on said lower end for pivotal movement between said first and second positions.*

*20. The device of claim 19 wherein:*

*said cover member is spring-biased toward said first position.*

*21. A portable, hand-carried, internal combustion engine powered air moving device which is configured to conveniently permit either right or left handed use thereof, is easily convertible between blower and vacuum modes of operation, and substantially reduces undesirable gyroscopic forces generated by the engine, said device comprising:*

*a generally hollow body having:*

*a top end with an operator carrying handle secured thereto,*

*a bottom end adapted to engage the ground and support said body thereon between use periods of said device,*

*a front side,*

*an upper portion having an outlet opening extending through said front side,*

*a lower end chamber downwardly bounded by said bottom end,*

*air inlet means for defining an air inlet opening extending through said bottom end into said lower end chamber, said air inlet means being selectively connectable to vacuum inlet conduit means to permit use of said device in said vacuum mode, and*

*air discharge means for defining an air discharge opening extending outwardly from said lower end chamber through said front side, said air discharge means being selectively connectable to blower discharge conduit means to permit use of said device in said blower mode, or to vacuum outlet conduit means to permit use of said device in said vacuum mode;*

*a cover member carried by said lower end for selective movement relative thereto between a first position in*

*which said cover member extends across a portion of said air inlet means in a manner permitting air to be drawn inwardly through said air inlet opening but precluding connection of vacuum inlet conduit means to said air inlet means, and a second position permitting connection of vacuum inlet conduit means to said air inlet means,*

*an internal combustion engine housed in said upper body portion and including:*

*a crankshaft carried within said upper body portion for driven rotation about an axis which, with said device in a normal operating position, is generally vertically oriented,*

*a cylinder disposed forwardly of said crankshaft within said upper body portion and having a piston mounted in said cylinder for generally horizontal reciprocation when said device is in a noraml operating position, said piston being connected to said crankshaft to rotationally drive it during piston reciprocation, and*

*a muffler carried in said upper body portion forwardly of said crankshaft, said muffler being adapted to receive exhaust gas from said cylinder and discharge the received exhaust gas through said front side of said body adjacent said outlet opening;*

*a centrifugal fan impeller positioned within said lower end chamber and rotationally drivable by said crankshaft about said axis to sequentially draw air into said lower end chamber through said air inlet opening and discharge the air from said lower end chamber outwardly through said air discharge opening; and*

*anti-entrainment means for preventing the entrainment of small but relatively heavy ground-disposed objects, such as pebbles or the like, into ground level inlet air approaching said cover member and said air inlet means when said engine is running, said cover member is in said first position thereof, and said bottom end of said body is resting upon or in close proximity to the ground, said anti-entrainment means being operative to maintain the velocity of said ground level inlet air at a magnitude generally insufficient to entrain said small but relatively heavy ground-disposed objects into said ground level inlet air,*

*whereby said lower end of said body may be rested upon or placed in close proximity to the ground, with said engine running and said device in said blower mode, without significant risk of drawing said small but relatively heavy objects into said lower end chamber and discharging them at high velocity through said discharge opening.*

*22. The device of claim 21 wherein:*

*said cover member is mounted on said lower end for pivotal movement between said first and second positions.*

*23. The device of claim 22 wherein:*

*said cover member is spring-biased toward said first position.*

*24. A portable, hand-carried air moving device which is convertible between blower and vacuum modes of operation, comprising:*

*a body having:*

*a top end with an operator carrying handle secured thereto,*

*a bottom end,*

*a front side,*

*a lower end chamber downwardly bounded by said bottom end,*

*air inlet means for defining an air inlet opening extending through said bottom end into said lower end chamber, said air inlet means being selectively connectable to vacuum inlet conduit means to permit use of said device in said vacuum mode, and*

*air discharge means for defining an air discharge opening extending outwardly from said lower end chamber through said front side, said air discharge means being selectively connectable to blower discharge conduit means to permit use of said device in said blower mode, or to vacuum outlet conduit means to permit use of said device in said vacuum mode;*

*drive means selectively operable to power said device, said drive means including shaft means carried by said body for driven rotation about an axis which, with said device in a normal operating position, is generally vertically oriented, said shaft means extending longitudinally upwardly from said lower end chamber;*

*a centrifugal fan impeller positioned within said lower end chamber and rotationally drivable by said shaft means about said axis to sequentially draw air into said lower end chamber through said air inlet opening and discharge the air from said lower end chamber outwardly through said air discharge opening; and*

*anti-entrainment means for preventing the entrainment of small but relative heavy ground-disposed objects, such as pebbles or the like, into air drawn into said inlet opening during operation of said device in said blower mode,*

*anti-entrainment means being operative, when said lower end of said body is placed against or in close proximity to the ground during driven rotation of said impeller, to maintain the velocity of ground level inlet air initially approaching said air inlet means at a magnitude generally insufficient to entrain said small but relatively heavy ground-disposed objects into said inlet air, thereby significantly reducing the risk of drawing such objects in said lower end chamber and discharging them at high velocity through said discharge opening.*

*25. A portable, hand-carried, internal combustion engine powered air moving device which is configured to conveniently permit either right or left handed use thereof, is easily convertible between blower and vacuum modes of operation, and substantially reduces undesirable gyroscopic forces generated by the engine, said device comprising:*

*a generally hollow body having:*

*a top end with an operator carrying handle secured thereto,*

*a bottom end,*

*a front side,*

*an upper portion having an outlet opening extending through said front side,*

*a lower end chamber downwardly bounded by said bottom end,*

*air inlet means for defining an air inlet opening extending through said bottom end into said lower end chamber, said air inlet means being selectively connectable to vacuum inlet conduit means to permit use of said device in said vacuum mode, and*

*air discharge means for defining an air discharge opening extending outwardly from said lower end chamber through said front side, said air discharge means being selectively connectable to blower discharge conduit means to permit use of said device in said blower mode, or to vacuum outlet conduit*

*means to permit use of said device in said vacuum mode;*

*a cover member carried by said lower end for selective movement relative thereto between a first position in which said cover member extends across a portion of said air inlet means in a manner permitting air to be drawn inwardly through said air inlet opening but precluding connection of vacuum inlet conduit means to said air inlet means, and a second position permitting connection of vacuum inlet conduit means to said air inlet means,*

*an internal combustion engine housed in said upper body portion and including:*

*a crankshaft carried within said upper body portion for driven rotation about an axis which, with said device in a normal operating position, is generally vertically oriented,*

*a cylinder disposed forwardly of said crankshaft within said upper body portion and having a piston mounted in said cylinder for generally horizontal reciprocation when said device is in a normal operating position, said piston being connected to said crankshaft to rotationally drive it during piston reciprocation, and*

*a muffler carried in said upper body portion forwardly of said crankshaft, said muffler being adapted to receive exhaust gas from said cylinder and discharge the received exhaust gas through said front side of said body adjacent said outlet opening;*

*a centrifugal fan impeller positioned within said lower end chamber and rotationally drivable by said crankshaft about said axis to sequentially draw air into said lower end chamber through said air inlet opening and discharge the air from said lower end chamber outwardly through said air discharge opening; and*

*grounding means for electrically grounding said operator carrying handle to prevent user static electric shock.*

*26. The air moving device of claim 25 wherein:*

*said device has a metal grounding portion,*

*said operator carrying handle is of a material having electrically conductive properties, and*

*said grounding means include an electrical conductor member operatively interconnected between said operator carrying handle and said metal grounding portion of said device.*

*27. The air moving device of claim 26 wherein:*

*said operator carrying handle is of a plastic polymer material containing about ten percent carbon.*

* * * * *

UNITED STATES PATENT AND TRADEMARK OFFICE

CERTIFICATE OF CORRECTION

PATENT NO. : RE 33,050

DATED : September 12, 1989

INVENTOR(S) : Lloyd H. Tuggle, Michael Baker, Jeffrey S. Franke

It is certified that error appears in the above-identified patent and that said Letters Patent is hereby corrected as shown below:

Title page, item [64], "Patent No. 6,741,468" should be --Patent No. 4,674,146--.

Col. 3, line 6, "12-13" should be --13-13--.

Col. 6, line 61, "connected" should be --connection--.

Col. 7, line 19, "feature" should be --featured--.

Col. 9, line 9, "claim" should be --claims--.

Col. 12, line 32, insert --said-- at beginning of paragraph.

Signed and Sealed this

Tenth Day of July, 1990

*Attest:*

HARRY F. MANBECK, JR.

*Attesting Officer*

*Commissioner of Patents and Trademarks*